United States Patent
Kennedy et al.

(10) Patent No.: US 11,352,565 B2
(45) Date of Patent: Jun. 7, 2022

(54) AMMONIUM POLYPHOSPHATE BASED AND DIAMMONIUM PHOSPHATE BASED FIRE-RETARDANT COMPOSITIONS

(71) Applicant: X'AAN INNOVATIONS INC., Surrey (CA)

(72) Inventors: Terrence Kennedy, Kamloops (CA); Mike Roberge, Surrey (CA)

(73) Assignee: X'AAN INNOVATIONS INC.

( * ) Notice: Subject to any disclaimer, the term of this patent is extended or adjusted under 35 U.S.C. 154(b) by 134 days.

(21) Appl. No.: 16/475,037

(22) PCT Filed: Jan. 2, 2018

(86) PCT No.: PCT/CA2018/050001
§ 371 (c)(1),
(2) Date: Jun. 28, 2019

(87) PCT Pub. No.: WO2018/119523
PCT Pub. Date: Jul. 5, 2018

(65) Prior Publication Data
US 2019/0322939 A1    Oct. 24, 2019

Related U.S. Application Data

(60) Provisional application No. 62/441,143, filed on Dec. 30, 2016.

(51) Int. Cl.
C09K 21/12    (2006.01)
C09K 21/02    (2006.01)
C09K 21/14    (2006.01)
C23F 11/18    (2006.01)

(52) U.S. Cl.
CPC .............. *C09K 21/12* (2013.01); *C09K 21/02* (2013.01); *C09K 21/14* (2013.01); *C23F 11/181* (2013.01)

(58) Field of Classification Search
CPC .................................................... C09K 21/04
See application file for complete search history.

(56) References Cited

U.S. PATENT DOCUMENTS

| | | | |
|---|---|---|---|
| 3,960,735 A * | 6/1976 | Lacey .................... | C09K 21/02 252/2 |
| 4,168,239 A * | 9/1979 | Mertz .................... | A62D 1/005 252/2 |
| 4,176,071 A | 11/1979 | Crouch | |
| 8,202,449 B2 | 6/2012 | Garner et al. | |
| 9,926,491 B2 | 3/2018 | Garner et al. | |
| 2015/0368561 A1* | 12/2015 | Garner .................. | C09K 21/04 252/602 |

FOREIGN PATENT DOCUMENTS

| CA | 1049247 | 2/1979 |
| CA | 2939033 A1 | 8/2014 |
| CN | 105749478 A * | 7/2016 |

OTHER PUBLICATIONS

English machine translation of Han (CN 105749478 A). (Year: 2016).*

* cited by examiner

*Primary Examiner* — Peter F Godenschwager
(74) *Attorney, Agent, or Firm* — Rudy J. Ng; Bozicevic, Field & Francis LLP

(57) ABSTRACT

An ammonium polyphosphate based fire-retardant composition comprises an ammonium polyphosphate or a diammonium phosphate, a suspending agent, a coloring agent, a surfactant, a thickening agent, and a corrosion inhibiting agent. The suspending agent may be a sheared clay. The sheared clay may be a sheared Attapulgite clay. The coloring agent may be iron oxide. The surfactant may be selected from the group of surfactants including sulfonates, carboxyl acids, carboxylates, carboxymethyl cellulose, and catechins. The surfactant may be an emulsifier. The thickening agent may be Xanthan gum with a weight average particle size diameter greater than 100 microns. The corrosion inhibiting agent may be potassium ferricyanide or potassium ferrocyanide.

28 Claims, No Drawings

AMMONIUM POLYPHOSPHATE BASED AND DIAMMONIUM PHOSPHATE BASED FIRE-RETARDANT COMPOSITIONS

BACKGROUND OF THE INVENTION

Field of the Invention

The present invention relates to fire-retardant compositions and, in particular, to ammonium polyphosphate based fire-retardant compositions and diammonium phosphate based fire-retardant compositions comprising potassium ferricyanide and/or potassium ferrocyanide.

Description of the Related Art

It is known to use ammonium polyphosphate based fire-retardant compositions and diammonium phosphate based fire-retardant compositions to combat wildland fires. However, ammonium polyphosphate and diammonium phosphate are corrosive and may damage equipment used to produce, store, handle, and apply the fire-retardant composition. There is accordingly a need for corrosion inhibiting agents which reduce the corrosivity of ammonium polyphosphate based fire-retardant compositions and diammonium phosphate based fire-retardant compositions. Ammonium polyphosphate based fire-retardant compositions and diammonium phosphate based fire-retardant compositions may also include a coloring agent, a suspending agent, a surfactant, a thickening agent, or any combination thereof.

U.S. Pat. No. 3,960,735 which issued on Jul. 1, 1976, to Lacey discloses a composition consisting essentially of an ammonium polyphosphate liquid and an iron cyanide blue. The iron cyanide blue being is in a minor amount effective to substantially reduce the corrosiveness of said composition to aluminum to less than or equal to 1 mil per year as determined by the "Uniform Corrosion" test set forth in Section 4.3.4 of the "Interim Specification" 5100-00302a (June 1972), entitled "Specification for Retardant, Forest Fire, Liquid Chemical, Unthickened for Aircraft or Ground Application," issued by the United States Department of Agriculture, Forest Service.

U.S. Pat. No. 4,176,071 which issued on Nov. 27, 1979, to Couch discloses a corrosion inhibitor mixture for ammonium sulfate fire-retardant compositions. The fire-retardant compositions generally comprise ammonium sulfate, a thickening agent, and water. The corrosion inhibitor mixture comprises a water-soluble cyanide compound and a water-soluble ortho-phosphate compound. The components of the corrosion inhibitor mixture are present in the fire-retardant compositions in a minor effective amount at least sufficient to inhibit the corrosivity of the fire retardant composition to aluminum, mild steel, and brass to less than 1 mil per year.

SUMMARY OF THE INVENTION

There is provided an ammonium polyphosphate based fire-retardant composition comprising an ammonium polyphosphate, a suspending agent, a coloring agent, a surfactant, a thickening agent, and a corrosion inhibiting agent. The suspending agent may be a sheared clay. The sheared clay may be a sheared Attapulgite clay. The coloring agent may be iron oxide. The surfactant may be selected from the group of surfactants including sulfonates, carboxyl acids, carboxylates, carboxymethyl cellulose, and catechins. The surfactant may be an emulsifier. The thickening agent may be Xanthan gum with a weight average particle size diameter greater than 100 microns. The corrosion inhibiting agent may be potassium ferricyanide or potassium ferrocyanide. The fire-retardant composition further includes a corrosion inhibiting agent selected from the group of corrosion inhibiting agents including benzotriazole, 2-mercaptobenzothiazole, and ammonium benzoate.

There is also provided a diammonium phosphate based fire-retardant composition comprising a diammonium phosphate, a suspending agent, a coloring agent, a surfactant, a thickening agent, and a corrosion inhibiting agent. The suspending agent may be a sheared clay. The sheared clay may be a sheared Attapulgite clay. The coloring agent may be iron oxide. The surfactant may be selected from the group of surfactants including sulfonates, carboxyl acids, carboxylates, carboxymethyl cellulose, and catechins. The surfactant may be an emulsifier. The thickening agent may be Xanthan gum with a weight average particle size diameter greater than 100 microns. The corrosion inhibiting agent may be potassium ferricyanide or potassium ferrocyanide. The fire-retardant composition further includes a corrosion inhibiting agent selected from the group of corrosion inhibiting agents including benzotriazole, 2-mercaptobenzothiazole, and ammonium benzoate.

DESCRIPTIONS OF THE PREFERRED EMBODIMENTS

Disclosed are fire-retardant compositions including an ammonium polyphosphate and a thickening agent. The fire-retardant compositions may also include a coloring agent, a surfactant, a thickening agent, or any combination thereof.

The fire-retardant compositions may include between about 88.0 wt % and about 95.0 wt % ammonium polyphosphate as the active fire-retardant component. The fire-retardant compositions may alternatively include between about 88.0 wt % and about 98.0 wt % diammonium phosphate (DAP) as an active fire-retardant component.

The fire-retardant compositions may include between about 1.0 wt % and about 4.0 wt % of a suspending agent. The suspending agent reduces separation and settling of the fire-retardant compositions during storage. The suspending agent may be in the form of a sheared clay such as Attapulgite clay, for example, a hydrous magnesium aluminum silicate gels such as MINI-U-GEL® FG or MINI-U-GEL® 400 from Active Minerals International, LLC of 1130 Dade Street, Quincy, Fla. 32351. Sheared clay may also function as a thickening agent to hold the fire-retardant composition together.

The fire-retardant compositions may include between about 1.0 wt % and about 3.5 wt % of a coloring agent. The coloring agent is used to increase the visibility of the fire-retardant compositions when the fire-retardant compositions are applied to wildland. The coloring agent may be an iron oxide coloring agent in the form of Bayferrox® Red 101 from Lanxess Deutschland GmbH of D-51369 Leverkusen, Federal Republic of Germany.

The fire retardant compositions may include between about 0.0 wt % and about 2.0 wt % of a surfactant. The surfactants support the even spread of corrosion inhibiting agents and other compounds within the fire-retardant composition to better dissipate the corrosion inhibiting agents. The surfactant may be between about 0.0 wt % and about 2.0 wt % sulfonates, carboxyl acids, carboxylates, carbomethyl cellulose, or catechins. The sulfonates, carboxyl acids, carboxylates, carbomethyl cellulose, and catechins may function as emulsifiers.

The fire-retardant compositions may include between about 0.5 wt % and about 3.0 wt % of a thickening agent. The thickening agent allows for more even distribution of the fire-retardant compositions when they are dropped from the air. The thickening agent may be Xanthan gum with a weight average particle size diameter greater than 100 microns. Xanthan gum may add viscosity and elasticity to the fire-retardant composition.

The fire-retardant composition further includes corrosion inhibiting agents selected from the group of corrosion inhibiting agents including potassium ferricyanide, potassium ferrocyanide, benzotriazole, 2-mercaptobenzothiazole, ammonium benzoate. The corrosion inhibiting agents reduce the corrosiveness of the fire-retardant composition. The fire-retardant composition may include between about 0.0 wt % and about 3.5 wt % potassium ferrocyanide. The fire-retardant composition may include between about 0.0 wt % and about 3.5 wt % potassium ferrocyanide. The fire-retardant composition may include between about 0.0 wt % and about 2.5 wt % benzotriazole. The fire-retardant composition may include between about 0.0 wt % and about 1.0 wt % 2-mercaptobenzothiazole as a corrosion inhibitor or 2-mercaptobenzothiazole added with other corrosion inhibitors to add synergy. The fire-retardant composition may include between about 0.0 wt % and about 2.5 wt % ammonium benzoate. The corrosion inhibitors provide the required protection required for aluminum, steel and bronze. The inhibitors may reduce the corrosion of magnesium.

Below are examples of formulations of the fire-retardant compositions disclosed herein. The fire-retardant compositions are formulated to pass the USDA Forest Service Specification 5100-304c as a Wet Concentrate and as a mixed (diluted) fire-retardant composition, with appropriate Health and Safety Performance, Combustion-Retarding Effectiveness, Physical Properties, and Materials Effects. It will be understood by a person skilled in the art that the components and wt % thereof will differ between different formulations. For example, formulations with higher wt % ferricyanide or ferrocyanide (e.g. above 2.66 wt %) may not require a surfactant or emulsifier.

Formulation 1

| Component | Grams | wt % |
|---|---|---|
| Ammonium Polyphosphate | 1115.63 | 93.12 |
| Attapulgite Clay MINI-U-GEL ® 400 | 17.97 | 1.50 |
| Iron Oxide | 14.38 | 1.20 |
| Xanthan Gum | 15.57 | 1.30 |
| Potassium Ferricyanide | 34.5 | 2.88 |
| Total | 1198.06 | 100.00 |

Formulation 2

| Component | Grams | wt % |
|---|---|---|
| Ammonium Polyphosphate | 1108.45 | 92.52 |
| Attapulgite Clay MINI-U-GEL ® 400 | 17.97 | 1.50 |
| Iron Oxide | 14.38 | 1.20 |
| Xanthan Gum | 15.57 | 1.30 |
| Potassium Ferricyanide | 28.51 | 2.38 |
| Benzotriazole | 11.98 | 1.00 |
| Emulsifier | 1.20 | 0.10 |
| Total | 1198.06 | 100.00 |

Formulation 3

| Component | Grams | wt % |
|---|---|---|
| Ammonium Polyphosphate | 1108.45 | 92.52 |
| Attapulgite Clay MINI-U-GEL ® 400 | 17.97 | 1.50 |
| Iron Oxide | 14.38 | 1.20 |
| Xanthan Gum | 15.57 | 1.30 |
| Potassium Ferricyanide | 28.51 | 2.38 |
| Ammonium Benzoate | 11.98 | 1.00 |
| Emulsifier | 1.20 | 0.10 |
| Total | 1198.06 | 100.00 |

Formulation 4

| Component | Grams | wt % |
|---|---|---|
| Ammonium Polyphosphate | 1115.63 | 93.12 |
| Attapulgite Clay MINI-U-GEL ® 400 | 17.97 | 1.50 |
| Iron Oxide | 14.38 | 1.20 |
| Xanthan Gum | 15.57 | 1.30 |
| Surfactant | 4.79 | 0.40 |
| Potassium Ferricyanide | 28.51 | 2.38 |
| 2mercaptobenzothiazole | 1.20 | 0.10 |
| Total | 1198.06 | 100.00 |

It will be understood by a person skilled in the art that many of the details provided above are by way of example only, and are not intended to limit the scope of the invention which is to be determined with reference to the following claims.

What is claimed is:

1. An ammonium polyphosphate based fire-retardant composition comprising:
   an ammonium polyphosphate;
   a suspending agent, the suspending agent being a sheared clay;
   a coloring agent, the coloring agent being iron oxide;
   a thickening agent, the thickening agent being Xanthan gum with a weight average particle size diameter greater than 100 microns; and
   a corrosion inhibiting agent, the corrosion inhibiting agent being potassium ferricyanide or potassium ferrocyanide.

2. The fire-retardant composition as claimed in claim 1 further including an emulsifier, wherein the emulsifier is a sulfonate.

3. The fire-retardant composition as claimed in claim 1 wherein the fire-retardant composition includes between about 88.0 wt % and about 95.0 wt % ammonium polyphosphate.

4. The fire-retardant composition as claimed in claim 1 wherein the fire-retardant composition includes between about 1.0 wt % and about 2.0 wt % sheared clay and the sheared clay is sheared Attapulgite clay.

5. The fire-retardant composition as claimed in claim 1 wherein the fire-retardant composition includes between about 1.0 wt % and about 3.5 wt % iron oxide.

6. The fire-retardant composition as claimed in claim 1 wherein the fire-retardant composition includes between about 0.5 wt % and about 3.0 wt % Xanthan gum.

7. The fire-retardant composition as claimed in claim 1 wherein the fire-retardant composition further includes up to about 1.0 wt % surfactant or 1.0% emulsifier.

8. The fire-retardant composition as claimed in claim 1 wherein the fire-retardant composition includes up to about 3.5 wt % potassium ferricyanide.

9. The fire-retardant composition as claimed in claim 1 wherein the fire-retardant composition includes up to about 3.5 wt % potassium ferrocyanide.

10. The fire-retardant composition as claimed in claim 1 wherein the fire-retardant composition further includes a corrosion inhibiting agent selected from the group of corrosion inhibiting agents including benzotriazole, 2-mercaptobenzothiazole, and ammonium benzoate.

11. The fire-retardant composition as claimed in claim 10 wherein the fire-retardant composition includes up to about up to about 2.5 wt % benzotriazole.

12. The fire-retardant composition as claimed in claim 10 wherein the fire-retardant composition includes up to about 1.0 wt % 2-mercaptobenzothiazole.

13. The fire-retardant composition as claimed in claim 10 wherein the fire-retardant composition includes up to about 2.5 wt % ammonium benzoate.

14. The fire-retardant composition as claimed in claim 1 wherein the fire-retardant composition further includes a surfactant, the surfactant being selected from the group of surfactants including sulfonates, carboxyl acids, carboxylates, carboxymethyl cellulose, and catechins.

15. The fire-retardant composition as claimed in claim 14 wherein the surfactant is a sulfonate.

16. A diammonium phosphate based fire-retardant composition comprising:
   a diammonium phosphate;
   a suspending agent, the suspending agent being a sheared clay;
   a coloring agent, the coloring agent being iron oxide;
   a thickening agent, the thickening agent being Xanthan gum with a weight average particle size diameter greater than 100 microns; and
   a corrosion inhibiting agent, the corrosion inhibiting agent being potassium ferricyanide or potassium ferrocyanide.

17. The fire-retardant composition as claimed in claim 16 wherein the fire-retardant composition includes between about 88.0 wt % and about 98.0 wt % diammonium phosphate.

18. The fire-retardant composition as claimed in claim 16 wherein the fire-retardant composition includes between about 1.0 wt % and about 4.0 wt % sheared clay and the sheared clay is sheared Attapulgite clay.

19. The fire-retardant composition as claimed in claim 16 wherein the fire-retardant composition includes between about 1.0 wt % and about 3.5 wt % iron oxide.

20. The fire-retardant composition as claimed in claim 16 wherein the fire-retardant composition includes between about 0.5 wt % and about 3.0 wt % Xanthan gum.

21. The fire-retardant composition as claimed in claim 16 wherein the fire-retardant composition includes up to about 3.5 wt % potassium ferricyanide.

22. The fire-retardant composition as claimed in claim 16 wherein the fire-retardant composition includes up to about 3.5 wt % potassium ferrocyanide.

23. The fire-retardant composition as claimed in claim 16 wherein the fire-retardant composition further includes a corrosion inhibiting agent selected from the group of corrosion inhibiting agents including benzotriazole, 2-mercaptobenzothiazole, and ammonium benzoate.

24. The fire-retardant composition as claimed in claim 23 wherein the fire-retardant composition includes up to about up to about 2.5 wt % benzotriazole.

25. The fire-retardant composition as claimed in claim 23 wherein the fire-retardant composition includes up to about 1.0 wt % 2-mercaptobenzothiazole.

26. The fire-retardant composition as claimed in claim 23 wherein the fire-retardant composition includes up to about 2.5 wt % ammonium benzoate.

27. The fire-retardant composition as claimed in claim 16 wherein the fire-retardant composition further includes a surfactant, the surfactant being selected from the group of surfactants including sulfonates, carboxyl acids, carboxylates, carboxymethyl cellulose, and catechins and the surfactant being an emulsifier.

28. The fire-retardant composition as claimed in claim 27 wherein the fire-retardant composition includes up to about 2.0 wt % surfactants.

\* \* \* \* \*